US011992052B2

(12) United States Patent
Lee et al.

(10) Patent No.: US 11,992,052 B2
(45) Date of Patent: May 28, 2024

(54) ATOMIZER AND CARTRIDGE INCLUDING THE SAME

(71) Applicant: KT&G CORPORATION, Daejeon (KR)

(72) Inventors: Jae Min Lee, Gyeonggi-do (KR); Dong Bum Kwon, Seoul (KR); Jin Soo Seong, Seoul (KR); Jong Sub Lee, Gyeonggi-do (KR)

(73) Assignee: KT&G CORPORATION, Daejeon (KR)

( * ) Notice: Subject to any disclaimer, the term of this patent is extended or adjusted under 35 U.S.C. 154(b) by 208 days.

(21) Appl. No.: 17/046,534

(22) PCT Filed: May 7, 2020

(86) PCT No.: PCT/KR2020/006035
§ 371 (c)(1),
(2) Date: Oct. 9, 2020

(87) PCT Pub. No.: WO2021/020698
PCT Pub. Date: Feb. 4, 2021

(65) Prior Publication Data

US 2022/0279848 A1 Sep. 8, 2022

(30) Foreign Application Priority Data

Jul. 30, 2019 (KR) ........................ 10-2019-0092655

(51) Int. Cl.
*A24F 40/46* (2020.01)
*A24F 40/10* (2020.01)
(Continued)

(52) U.S. Cl.
CPC .............. *A24F 40/46* (2020.01); *A24F 40/10* (2020.01); *A24F 40/42* (2020.01); *A24F 40/44* (2020.01);
(Continued)

(58) Field of Classification Search
CPC ........ H05B 2203/021; H05B 2203/002; H05B 3/16; A24F 40/46; A24F 40/10; A24F 40/44; A24F 40/42
(Continued)

(56) References Cited

U.S. PATENT DOCUMENTS 9,277,770 B2 * 3/2016 DePiano ................ A24F 40/46
9,439,456 B2 * 9/2016 Liu ......................... A24F 40/46
(Continued)

FOREIGN PATENT DOCUMENTS

CN 102216129 A 10/2011
CN 106231932 A 12/2016
(Continued)

OTHER PUBLICATIONS

Office Action dated Jul. 12, 2021 in Korean Application No. 10-2019-0092655.
(Continued)

*Primary Examiner* — Abdullah A Riyami
*Assistant Examiner* — Vladimir Imas
(74) *Attorney, Agent, or Firm* — Sughrue Mion, PLLC

(57) ABSTRACT

An atomizer includes a liquid delivery element configured to absorb an aerosol generating material of a liquid storage and a wire configured to heat the aerosol generating material and wound on a surface of the liquid delivery element, wherein the wire is wound in a spiral shape such that coils of the wire are spaced apart from each other by a certain distance on the surface of the liquid delivery element, one of end portions of the wire is in contact with a first portion of the surface of the liquid delivery element, and the other one of the end portions of the wire is in contact with a second portion of the surface of the liquid delivery element.

10 Claims, 4 Drawing Sheets

(51) Int. Cl.
*A24F 40/42* (2020.01)
*A24F 40/44* (2020.01)
*H05B 3/16* (2006.01)

(52) U.S. Cl.
CPC ......... *H05B 3/16* (2013.01); *H05B 2203/002* (2013.01); *H05B 2203/021* (2013.01)

(58) Field of Classification Search
USPC ........................................................ 131/329
See application file for complete search history.

(56) References Cited

U.S. PATENT DOCUMENTS

| | | | | |
|---|---|---|---|---|
| 9,795,168 | B2 * | 10/2017 | Zhu | A24F 40/46 |
| 10,251,424 | B2 * | 4/2019 | Tucker | H05B 3/42 |
| 10,716,331 | B2 * | 7/2020 | Biel | A61M 11/042 |
| 10,888,124 | B2 | 1/2021 | Foghetti et al. | |
| 11,234,463 | B2 * | 2/2022 | DePiano | F22B 1/282 |
| 11,253,002 | B2 * | 2/2022 | Zhang | A24F 40/485 |
| 11,723,405 | B2 * | 8/2023 | Otiaba | A24F 40/42 131/329 |
| 11,730,199 | B2 * | 8/2023 | Atkins | A24F 40/485 131/329 |
| 2011/0303231 | A1 * | 12/2011 | Li | A24F 40/42 131/329 |
| 2014/0261408 | A1 * | 9/2014 | DePiano | A24F 40/70 128/202.21 |
| 2017/0035109 | A1 * | 2/2017 | Liu | A24F 40/42 |
| 2017/0135403 | A1 | 5/2017 | Liu | |
| 2017/0188626 | A1 * | 7/2017 | Davis | A24F 40/42 |
| 2017/0196264 | A1 * | 7/2017 | Liu | A24F 40/60 |
| 2017/0202267 | A1 * | 7/2017 | Liu | A24F 40/42 |
| 2018/0070639 | A1 | 3/2018 | Chen et al. | |
| 2018/0168233 | A1 | 6/2018 | DePiano et al. | |
| 2018/0220707 | A1 * | 8/2018 | Biel | A24F 40/40 |
| 2018/0317559 | A1 * | 11/2018 | Qiu | A24F 40/485 |
| 2019/0110518 | A1 * | 4/2019 | Foghetti | A24F 40/60 |
| 2019/0116882 | A1 | 4/2019 | Ampolini et al. | |
| 2020/0022413 | A1 * | 1/2020 | Zhang | A24F 40/485 |
| 2022/0110371 | A1 | 4/2022 | Depiano et al. | |
| 2022/0295886 | A1 * | 9/2022 | Kim | A24F 40/20 |
| 2022/0369707 | A1 * | 11/2022 | Lee | A24F 40/10 |

FOREIGN PATENT DOCUMENTS

| | | | |
|---|---|---|---|
| CN | 109068734 | A | 12/2018 |
| KR | 10-2018-0123030 | A | 11/2018 |
| KR | 10-2018-0129784 | A | 12/2018 |
| WO | 2010/044768 | A1 | 4/2010 |
| WO | 2016/061859 | A1 | 4/2016 |
| WO | 2019/038521 | A1 | 2/2019 |

OTHER PUBLICATIONS

Office Action dated Mar. 30, 2023 in Chinese Application No. 202080002609.6.

Office Action dated Mar. 1, 2022 issued by the Japanese Patent Office in Japanese Application No. 2020-567193.

International Search Report of PCT/KR2020/006035 dated Aug. 11, 2020 [PCT/ISA/210].

Written Opinion of PCT/KR2020/006035 dated Aug. 11, 2020 [PCT/ISA/237].

Extended European Search Report dated May 23, 2022 in European Application No. 20789429.6.

* cited by examiner

[Fig. 1]
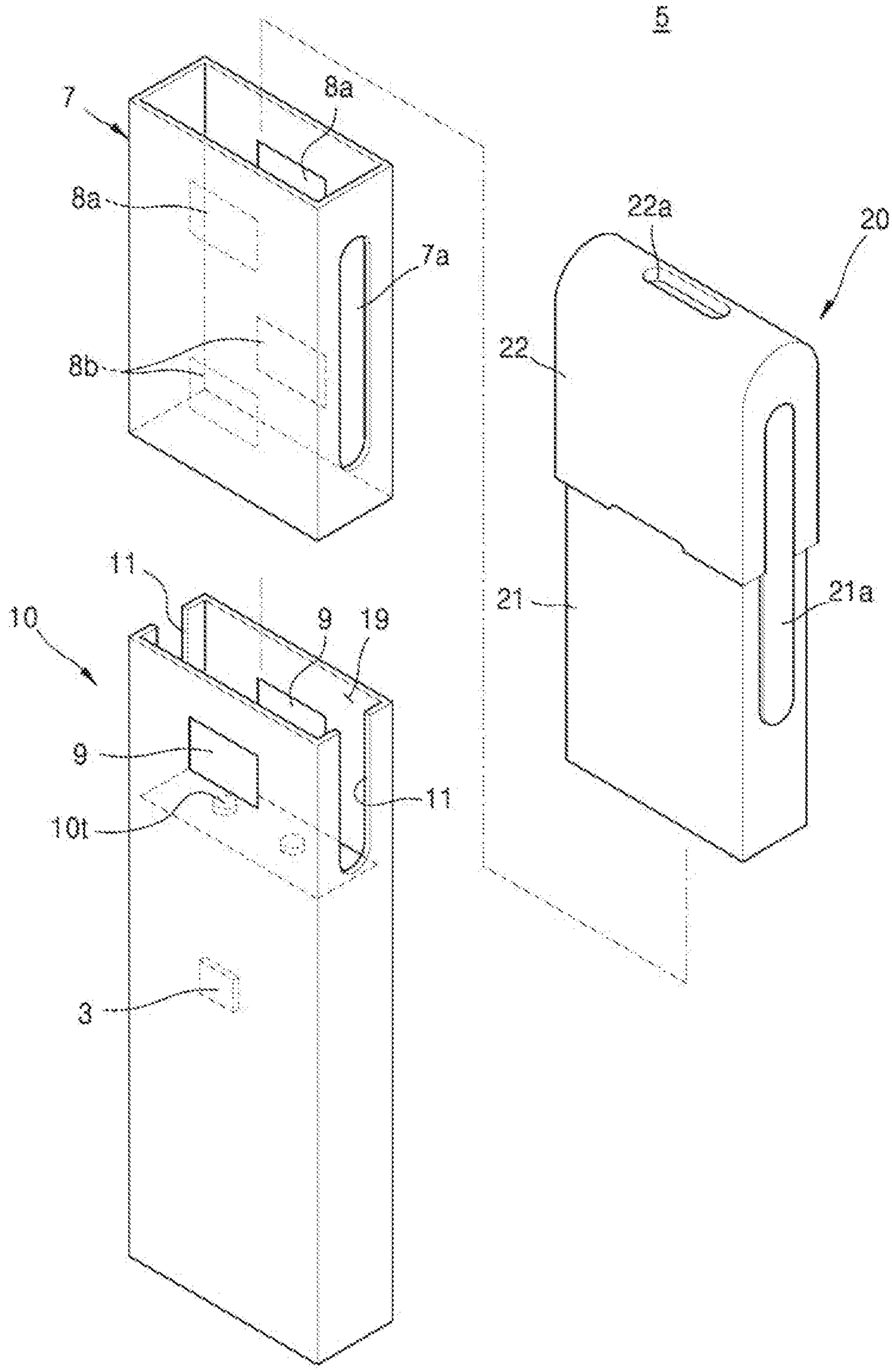

[Fig. 2]
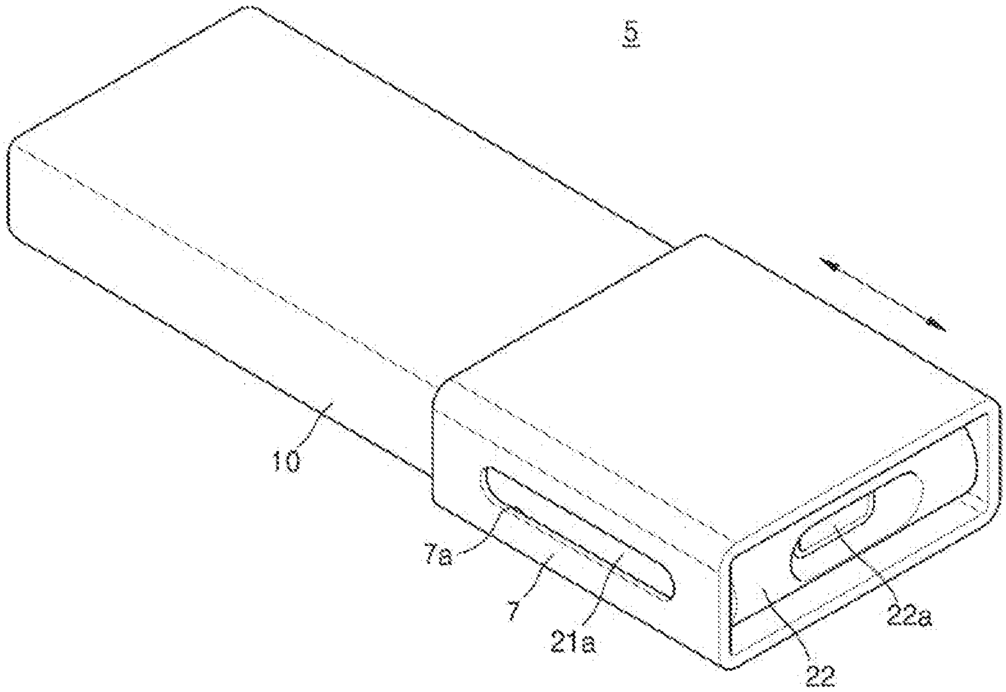
[Fig. 3]
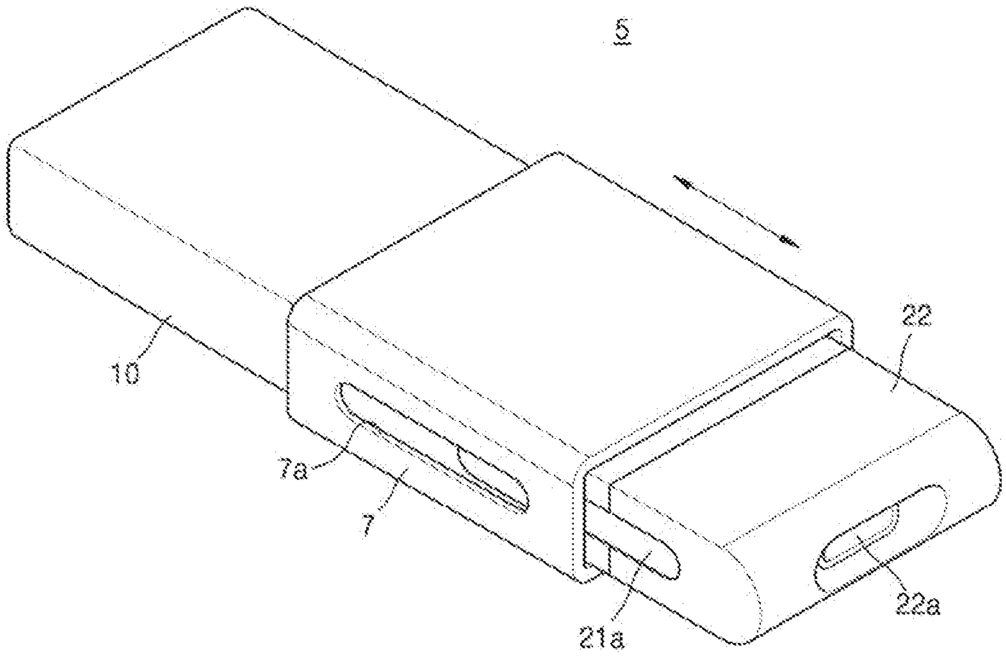

[Fig. 4]
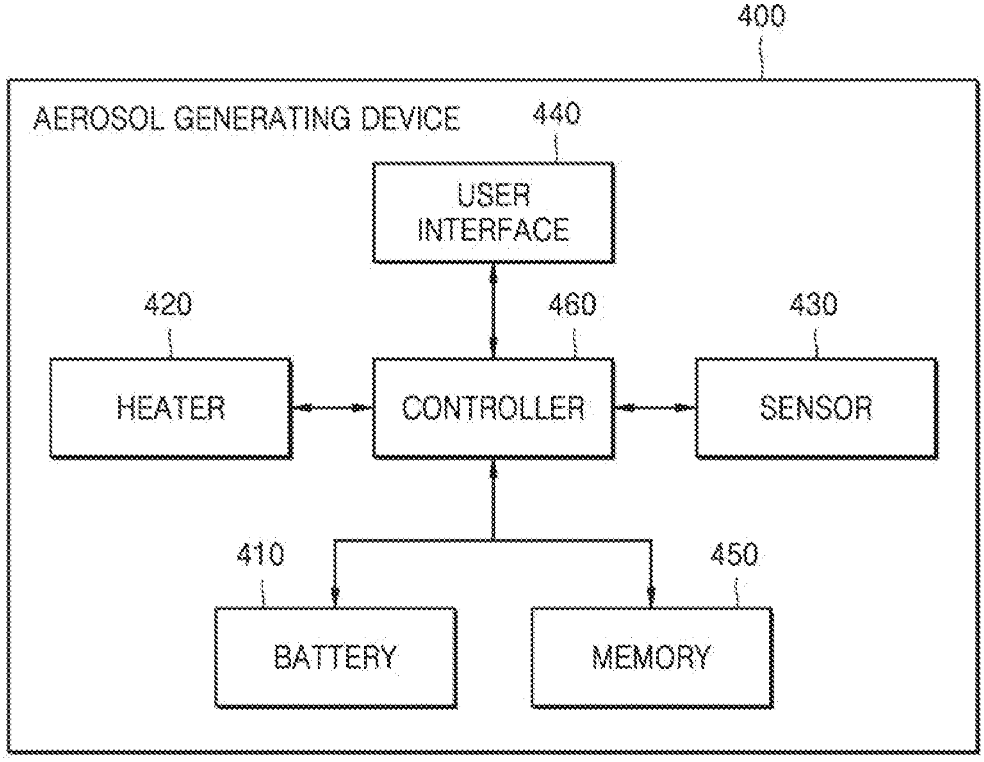
[Fig. 5]
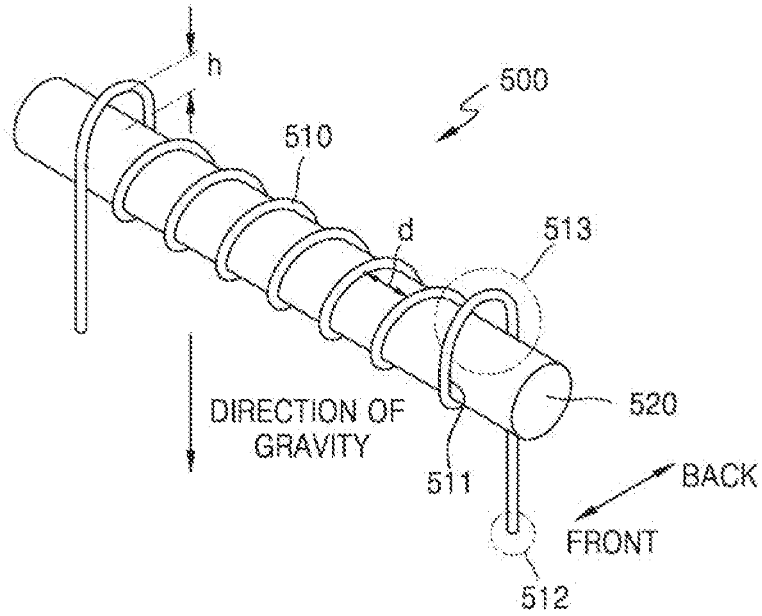

[Fig. 6]
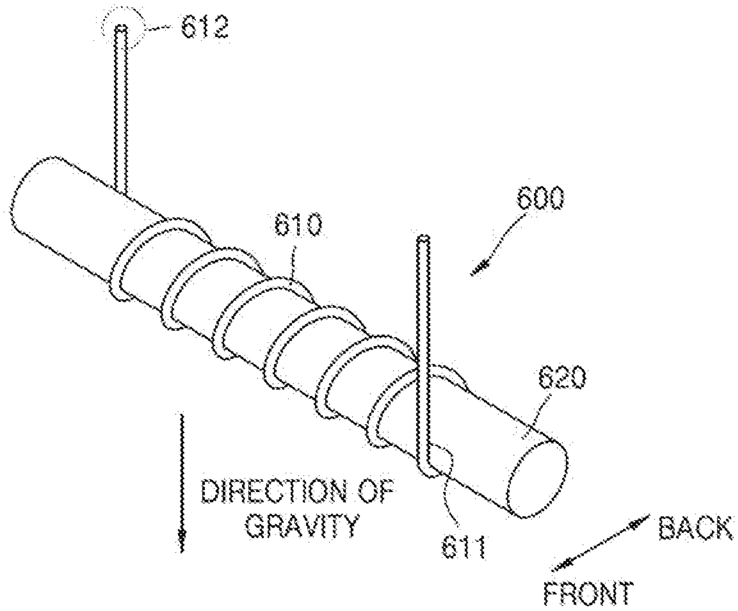

ATOMIZER AND CARTRIDGE INCLUDING THE SAME

TECHNICAL FIELD

The present disclosure relates to an atomizer and a cartridge including the same.

BACKGROUND ART

Recently, the demand for an alternative to traditional cigarettes has greatly increased. For example, there is growing demand for an aerosol generating device that generates aerosol by heating an aerosol generating material rather than by combusting cigarettes. Accordingly, research into a heating-type aerosol generating device have been actively conducted.

DISCLOSURE OF INVENTION

Technical Problem

When an aerosol generating device stops heating a liquid aerosol generating material absorbed by aerosol delivery element such as a wick, leakage may occur by the liquid. For example, the liquid may flow out of the heating wire, which causes many problems.

Solution to Problem

According to one or more embodiments, an atomizer includes a liquid delivery element configured to absorb an aerosol generating material of a liquid storage and a wire configured to heat the aerosol generating material and wound on a surface of the liquid delivery element, wherein the wire is wound in a spiral shape such that coils of the wire are spaced apart from each other by a certain distance on the surface of the liquid delivery element, one of end portions of the wire is in contact with a first portion of the surface of the liquid delivery element, and the other one of the end portions of the wire is in contact with a second portion of the surface of the liquid delivery element.

The end portions of the wire are disposed such that the aerosol generating material does not flow out of the wire through the end portions.

The end portions of the wire may point in a direction different from a direction of gravity.

The end portions of the wire may include a ridge portion.

A top of the ridge portion may be separated from the liquid delivery element by a certain distance.

The certain distance may range 0,001 mm to 2 mm.

According to one or more embodiments, a cartridge includes a liquid storage configured to store an aerosol generating material and an atomizer configured to heat the aerosol generating material and generate aerosol, wherein a liquid delivery element configured to absorb the aerosol generating material; and a wire configured to heat the aerosol generating material and wound on a surface of the liquid delivery element, the wire is wound in a spiral shape such that coils of the wire are spaced apart from each other by a certain distance on the surface of the liquid delivery element, one of end portions of the wire is in contact with a first portion of the surface of the liquid delivery element, and the other one of the end portions of the wire is in contact with a second portion of the surface of the liquid delivery element.

The end portions of the wire are disposed such that the aerosol generating material does not flow out of the wire through the end portions.

The end portions of the wire may point in a direction different from a direction of gravity.

The end portions of the wire may include a ridge portion.

A top of the ridge portion may be separated from the liquid delivery element by a certain distance.

The certain distance may range 0.001 mm to 2 mm.

Advantageous Effects of Invention

According to the embodiments, aerosol generating material can be prevented from flowing along the heating wire toward the end portions of the heating wire. Therefore, aerosol generating material may be prevented from leaking out of the heating wire through the end portions.

BRIEF DESCRIPTION OF DRAWINGS

The above and other aspects, features, and advantages of certain embodiments of the disclosure will be more apparent from the following description taken in conjunction with the accompanying drawings, in which:

FIG. 1 is an exploded perspective view schematically illustrating a coupling relationship between a replaceable cartridge containing an aerosol generating material and an aerosol generating device including the same, according to an embodiment.

FIG. 2 is a perspective view of an example operating state of the aerosol generating device according to the embodiment illustrated in FIG. 1.

FIG. 3 is a perspective view of another example operating state of the aerosol generating device according to the embodiment illustrated in FIG. 1.

FIG. 4 is a block diagram illustrating hardware components of the aerosol generating device according to an embodiment.

FIG. 5 is a diagram of an example of an atomizer according to an embodiment; and FIG. 6 is a diagram of another example of an atomizer according to an embodiment.

BEST MODE FOR CARRYING OUT THE INVENTION

According to one or more embodiments, an atomizer includes a liquid delivery element configured to absorb an aerosol generating material of a liquid storage and a wire configured to heat the aerosol generating material and wound on a surface of the liquid delivery element, wherein the wire is wound in a spiral shape such that coils of the wire are spaced apart from each other by a certain distance on the surface of the liquid delivery element, one of end portions of the wire is in contact with a first portion of the surface of the liquid delivery element, and the other one of the end portions of the wire is in contact with a second portion of the surface of the liquid delivery element.

MODE FOR THE INVENTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and; or" includes any and all combinations of one or more of the associated listed items. Expressions such as "at least one of," when preceding a list of elements, modify the entire list of elements and do not modify the individual elements of the list.

With respect to the terms used to describe the various embodiments, general terms which are currently and widely used are selected in consideration of functions of structural elements in the various embodiments of the present disclosure. However, meanings of the terms can be changed according to intention, a judicial precedence, the appearance of new technology, and the like. There are terms discretionally selected by an applicant on particular occasions. These terms will be explained in detail in relevant description. Therefore, terms used herein are not just names but should be defined based on the meaning of the terms and the whole content of the present disclosure.

In addition, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and/or operation and can be implemented by hardware components or software components and combinations thereof.

As used herein, expressions such as "at least one of," when preceding a list of elements, modify the entire list of elements and do not modify the individual elements of the list. For example, the expression, "at least one of a, b, and c," should be understood as including only a, only b, only c, both a and c, both a and c, both b and c, or all of a, b, and c.

It will be understood that when an element or layer is referred to as being "over," "above," "on," "connected to" or "coupled to" another element or layer, it can be directly over, above, on, connected or coupled to the other element or layer or intervening elements or layers may be present. In contrast, when an element is referred to as being "directly over," "directly above," "directly on," "directly connected to" or "directly coupled to" another element or layer, there are no intervening elements or layers present. Like numerals refer to like elements throughout.

Hereinafter, the present disclosure will now be described more fully with reference to the accompanying drawings, in which example embodiments of the present disclosure are shown such that one of ordinary skill in the art may easily work the present disclosure. The disclosure may, however, be embodied in many different forms and should not be construed as being limited to the embodiments set forth herein.

Hereinafter, embodiments of the present disclosure will be described in detail with reference to the drawings.

FIG. 1 is an exploded perspective view schematically illustrating a coupling relationship between a replaceable cartridge containing an aerosol generating material and an aerosol generating device including the same, according to an embodiment.

An aerosol generating device 5 according to the embodiment illustrated in FIG. 1 includes the cartridge 20 containing the aerosol generating material and a main body 10 supporting the cartridge 20.

The cartridge 20 containing the aerosol generating material may be coupled to the main body 10. A portion of the cartridge 20 may be inserted into an accommodation space 19 of the main body 10 so that the cartridge 20 may be coupled to the main body 10.

The cartridge 20 may contain an aerosol generating material in at least one of, for example, a liquid state, a solid state, a gaseous state, or a gel state. The aerosol generating material may include a liquid composition. For example, the liquid composition may be a liquid including a tobacco-containing material having a volatile tobacco flavor component, or a liquid including a non-tobacco material.

The cartridge 20 is operated by an electrical signal or a wireless signal transmitted from the main body 10 to perform a function of generating aerosol by converting the phase of the aerosol generating material inside the cartridge 20 to a gaseous phase. The aerosol may refer to a gas in which vaporized particles generated from an aerosol generating material are mixed with air.

For example, in response to receiving the electrical signal from the main body 10, the cartridge 20 may convert the phase of the aerosol generating material by heating the aerosol generating material, using, for example, an ultrasonic vibration method or an induction heating method. In an embodiment, the cartridge 20 may include its own power source and generate aerosol based on an electric control signal or a wireless signal received from the main body 10.

The cartridge 20 may include a liquid storage 21 accommodating the aerosol generating material therein, and an atomizer performing a function of converting the aerosol generating material of the liquid storage 21 to aerosol.

When the liquid storage 21 "accommodates the aerosol generating material" therein, it means that the liquid storage 21 functions as a container simply holding an aerosol generating material and that the liquid storage 21 includes therein an element containing an aerosol generating material, such as a sponge, cotton, fabric, or porous ceramic structure.

The atomizer may include, for example, a liquid delivery element (e.g., wick) for absorbing the aerosol generating material and maintaining the same in an optimal state for conversion to aerosol, and a heater heating the liquid delivery element to generate aerosol.

The liquid delivery element may include at least one of, for example, a cotton fiber, a ceramic fiber, a glass fiber, and porous ceramic.

The heater may include a metallic material such as copper, nickel, tungsten, or the like to heat the aerosol generating material delivered to the liquid delivery element by generating heat using electrical resistance. The heater may be implemented by, for example, a metal wire, a metal plate, a ceramic heating element, or the like. Also, the heater may be implemented by a conductive filament using a material such as a nichrome wire, and may be wound around or arranged adjacent to the liquid delivery element.

In addition, the atomizer may be implemented by a heating element in the form of a mesh or plate, which absorbs the aerosol generating material and maintains the same in an optimal state for conversion to aerosol, and generates aerosol by heating the aerosol generating material. In this case, a separate liquid delivery element may not be required.

At least a portion of the liquid storage 21 of the cartridge 20 may include a transparent portion so that the aerosol generating material accommodated in the cartridge 20 may be visually identified from the outside. The liquid storage 21 includes a protruding window 21*a* protruding from the liquid storage 21, so that the liquid storage 21 may be inserted into a groove 11 of the main body 10 when coupled to the main body 10. A mouthpiece 22 and/or the liquid storage 21 may be entirely formed of transparent plastic or glass. Alternatively, only the protruding window 21*a* may be formed of a transparent material.

The main body 10 includes a connection terminal 10*t* arranged inside the accommodation space 19. When the liquid storage 21 of the cartridge. 20 is inserted into the accommodation space 19 of the main body 10, the main body 10 may provide power to the cartridge 20 or supply a signal related to an operation of the cartridge 20 to the cartridge 20, through the connection terminal 10*t*.

The mouthpiece 22 is coupled to one end of the liquid storage 21 of the cartridge 20. The mouthpiece 22 is a portion of the aerosol generating device 5, which is to be inserted into a user's mouth. The mouthpiece 22 includes a discharge hole 22*a* for discharging aerosol generated from the aerosol generating material inside the liquid storage 21 to the outside.

The slider 7 is coupled to the main body 10 in such a way that the slider 7 may move on the main body 10. The slider 7 covers or exposes at least a portion of the mouthpiece 22 of the cartridge 20 coupled to the main body 10 by moving with respect to the main body 10. The slider 7 includes an elongated hole 7*a* exposing at least a portion of the protruding window 21*a* of the cartridge 20 to the outside.

As shown FIG. 1, the slider 7 may have a shape of a hollow container with both ends opened, but the structure of the slider 7 is not limited thereto. For example, the slider 7 may have a bent plate structure having a clip-shaped cross-section, which is movable with respect to the main body 10 while being coupled to an edge of the main body 10. In another example, the slider 7 may have a curved semi-cylindrical shape with a curved arc-shaped cross section.

The slider 7 may include a magnetic body for maintaining the position of the slider 7 with respect to the main body 10 and the cartridge 20. The magnetic body may include a permanent magnet or a material such as iron, nickel, cobalt, or an alloy thereof.

The magnetic body may include two first magnetic bodies 8*a* facing each other, and two second magnetic bodies 8*b* facing each other. The first magnetic bodies 8*a* may be spaced apart from the second magnetic bodies 8*b* in a longitudinal direction of the main body 10 (i.e., the direction in which the main body 10 extends), which is a moving direction of the slider 7.

The main body 10 includes a fixed magnetic body 9 arranged on a path along which the first magnetic bodies 8*a* and the second magnetic bodies 8*b* of the slider 7 move as the slider 7 moves with respect to the main body 10. Two fixed magnetic bodies 9 of the main body 10 may be mounted to face each other with the accommodation space 19 therebetween.

The slider 7, the slider 7 may be stably maintained in a position where an end of the mouthpiece 22 is covered or exposed by a magnetic force acting between the fixed magnetic body 9 and the first magnetic body 8*a* or between the fixed magnetic body 9 and the second magnetic body 8*b*.

The main body 10 includes a position change detecting sensor 3 arranged on the path along which the first magnetic body 8*a* and the second magnetic body 8*h* of the slider 7 move as the slider 7 moves with respect to the main body 10. The position change detecting sensor 3 may include, for example, a Hall integrated circuit (IC) that uses the Hall effect to detect a change in a magnetic field, and may generate a signal based on the detected change.

In the aerosol generating device 5 according to the above-described embodiments, horizontal cross sections of the main body 10, the cartridge 20, and the slider 7 have approximately rectangular shapes (i.e., when viewed in the longitudinal direction), but in the embodiments, the shape of the aerosol generating device 5 is not limited. The aerosol generating device 5 may have, for example, a cross-sectional shape of a circle, an ellipse, a square, or various polygonal shapes. In addition, the aerosol generating device 5 is not necessarily limited to a structure that extends linearly, and may be curved in a streamlined shape or bent at a preset angle in a specific area to be easily held by the user.

FIG. 2 is a perspective view of an example operating state of the aerosol generating device according to the embodiment illustrated in FIG. 1.

In FIG. 2, the slider 7 is moved to a position where the end of the mouthpiece 22 the cartridge coupled to the main body 10 is covered. In this state, the mouthpiece 22 may be safely protected from external impurities and kept clean.

The user may check the remaining amount of aerosol generating material contained in the cartridge by visually checking the protruding window 21*a* of the cartridge through the elongated hole 7*a* of the slider 7. The user may move the slider 7 in the longitudinal direction of the main body 10 to use the aerosol generating device 5.

FIG. 3 is a perspective view of another example operating state of the aerosol generating device according to the embodiment illustrated in FIG. 1.

In FIG. 3, the operating state is shown in which the slider 7 is moved to a position where the end of the mouthpiece 22 of the cartridge coupled to the main body 10 is exposed to the outside. In this state, the user may insert the mouthpiece 22 into his or her mouth and inhale aerosol discharged through the discharge hole 22*a* of the mouthpiece 22.

As shown in FIG. 3, the protruding window 21*a* of the cartridge is still exposed to the outside through the elongated hole 7*a* of the slider 7 when the slider 7 is moved to the position where the end of the mouthpiece 22 is exposed to the outside. Thus, the user may visually check the remaining amount of aerosol generating material contained in the cartridge, regardless of the position of the slider 7.

Referring to FIG. 1, the aerosol generating device 5 may include a position change detecting sensor 3. The position change detecting sensor 3 may detect a change in a position of the slider 7.

In one embodiment, the position change detection sensor 3 may detect a change in magnetization of magnetic material or a direction, intensity, or the like of a magnetic field. The slider 7 may include a magnet, and the position change detection sensor 3 may detect the movement of the magnet included in the slider 7.

For example, the position change detecting sensor 3 may include a Hall effect sensor, a rotating coil, a magnetoresistor, or a superconducting quantum interference device (SQUID) but is not limited thereto.

In the following description, the position of the slider 7 as shown in FIG. 2 where the slider 7 covers the end of the mouthpiece 22 is referred to as a first position. And, the position of the slider 7 as shown in FIG. 3 where the slider 7 exposes the end of the mouthpiece 22 to the outside is referred to as a second position. Since the slider 7 is slidably coupled to the main body 10, the user can move the slider 7 between the first position and the second position. The position change detection sensor 3 may detect the position change of the slider 7 moving between the first position and the second position.

In one embodiment, when the slider 7 is moved from the first position to the second position, the controller of the aerosol generating device 5 may receive an input signal from the position change detection sensor 3. The controller may set the mode of the aerosol generating device 5 to a preheating mode in response to the input signal.

In addition, the controller may determine whether the cartridge 20 is coupled to the main body 10. The aerosol generating device 5 may include a separate sensor for detecting whether the cartridge 20 and the main body 10 are coupled. Alternatively, the controller may determine whether the cartridge 20 is coupled to the main body 10 by periodically applying current to a circuit of the main body 10 that is electrically connected to a heater of the cartridge 20 and receiving an output value.

In one embodiment, after the cartridge 20 is coupled to the main body 10, the controller may set the mode of the aerosol generating device 5 to the preheating mode in response to the input signal received from the position change detection sensor 3. When it is determined that the cartridge 20 is not coupled to the main body 10, even if the controller receives an input signal from the position change detection sensor 3, the controller may not set the mode of the aerosol generating device 5 to the preheating mode.

In addition, the controller may set the mode of the aerosol generating device 5 to the sleep mode based on the position change of the slider 7. In one embodiment, when the slider 7 is moved from the second position to the first position, the controller receives the input signal from the position change detection sensor 3 and then sets the mode of the aerosol generating device 5 to the sleep mode.

FIG. 4 is a block diagram illustrating hardware components of the aerosol generating device according to an embodiment.

Referring to FIG. 4, the aerosol generating device 400 may include a battery 410, a heater 420, a sensor 430, a user interface 440, a memory 450 and a controller 460. However, the inner structure of the aerosol generating device 400 is not limited to what is illustrated in FIG. 4. One of ordinary skill in the art will understand that some hardware components illustrated in FIG. 4 may be omitted or new components may be added, according to the design of the aerosol generating device 400.

In an embodiment, the aerosol generating device 400 may include only a main body without a cartridge. In this case, the components of the aerosol generating device 400 may be located in the main body. In one or more embodiments, the aerosol generating device 400 may include a main body and a cartridge, and the components of the aerosol generating device 400 may be located in the main body and/or the cartridge.

Hereinafter, the operation of each of the hardware components of the aerosol generating device 400 will be described without limiting the location of each component.

The battery 410 supplies electric power to be used for the aerosol generating device 400 to operate. For example, the battery 410 may supply power such that the heater 420 may be heated. In addition, the battery 410 may supply power required for operation of other components of the aerosol generating device 400, such as the sensor 430, the user interface 440, the memory 450, and the controller 460. The battery 410 may be a rechargeable battery or a disposable battery. For example, the battery 410 may be a lithium polymer (LiPoly) battery, but is not limited thereto.

The heater 420 receives power from the battery 410 under the control of the controller 106. The heater 420 may receive power from the battery 410 and heat a cigarette inserted into the aerosol generating device 400 or a cartridge coupled to the aerosol generating device 400.

The heater 420 may be located in a main body of the aerosol generating device 400. Alternatively, the heater 420 may be located in the cartridge. When the heater 420 is located in the cartridge, the heater 420 may receive power from the battery 410, which is located the main body and/or the cartridge.

The heater 420 may include a suitable electrically resistive material For example, the suitable electrically resistive material may be a metal or a metal alloy including titanium, zirconium, tantalum, platinum, nickel, cobalt, chromium, hafnium, niobium, molybdenum, tungsten, tin, gallium, manganese, iron, copper, stainless steel, or nichrome, but is not limited thereto. The heater 420 may include a metal plate including a metal wire or an electroconductive track or a ceramic heating element but is not limited thereto.

In an embodiment, the heater 420 may be included in the cartridge. The cartridge may include the heater 420, the liquid delivery element, and the liquid storage. The aerosol generating material accommodated in the liquid storage may be absorbed by the liquid delivery element, and the heater 420 may heat the aerosol generating material absorbed by the liquid delivery element, thereby generating aerosol. For example, the heater 420 may include a material such as nickel or chromium and may be wound around or arranged adjacent to the liquid delivery element.

Alternatively, the heater 420 may heat a cigarette inserted into an accommodation space of the aerosol generating device 400, when the cigarette is accommodated in the accommodation space of the aerosol generating device 400, the heater 420 may be located inside and/or outside the cigarette and heat an aerosol generating material of the cigarette to generate aerosol.

The heater 420 may include an induction heating heater. The heater 420 may include an electroconductive coil to heat a cigarette or a cartridge using an induction heating method, and the cigarette or the cartridge may include a susceptor which may be heated by an induction heating heater.

The aerosol generating device 400 may include at least one sensor 430. A sensing result of the at least one sensor 430 may be transmitted to the controller 460, and the controller 460 may control the aerosol generating device 400 to perform various functions, such as control of the operation of the heater 420, limitation of smoking, determination of insertion or non-insertion of a cigarette (or a cartridge), and display of notification, according to the sensing result.

For example, the at least one sensor 430 may include a puff detecting sensor. The puff detecting sensor may detect a user's puff based on a temperature change, a flow change, a voltage change, and/or a pressure change.

Also, the at least one sensor 430 may include a temperature detecting sensor. The temperature detecting sensor may sense the temperature at which the heater 420 (or aerosol generating material) is heated. The aerosol-generating device 400 may include a separate temperature detecting sensor for sensing the temperature of the heater 420, or instead of including a separate temperature detecting sensor, the heater 420 itself may serve as a temperature detecting sensor. Alternatively, while the heater 420 functions as a temperature detecting sensor, a separate temperature detecting sensor may be further included in the aerosol generating device 400.

The sensor 430 may include a position change detecting sensor. The position change detecting sensor may detect a change in a position of the slider which is slidably coupled to the main body.

The user interface 440 may provide a user with information about a state of the aerosol generating device 400. The user interface 440 may include various interfacing elements, such as a display or a lamp which outputs visual information, a motor outputting tactile information, a speaker outputting sound information, terminals which exchange data with input/output (I/O) interfacing elements (e.g., buttons or touch screens) receiving information input by a user or outputting information to a user or receive charging power, and a communication interfacing module which performs wireless communication (e.g., Wi-Fi, Wi-Fi. Direct, Bluetooth, near-field communication (NFC)) with an external device.

However, only some of the given examples of the user interface 440 may be selectively implemented in the aerosol generating device 400.

The memory 450 may store data processed by the controller 460 and data to be processed. The memory 450 may include various types of memory such as dynamic RAM (DRAM), static RAM (SRAM), read-only memory (ROM), electrically erasable programmable ROM (EEPROM), etc.

The memory 450 may store data about an operating time of the aerosol generating device 400, a maximum puff count, a current puff count, at least one temperature profile, a user's smoking pattern, and the like.

The controller 460 may control overall operations of the aerosol generating device 400. The controller 460 includes at least one processor. A processor can be implemented as an array of a plurality of logic gates or can be implemented as a combination of a microprocessor and a memory in which a program executable in the microprocessor is stored. It will be understood by one of ordinary skill in the art that the processor may be implemented as another type of hardware.

The controller 460 analyzes the sensing result of the at least one sensor 460 and controls subsequent processes.

Based on the sensing result of the at least one sensor 430, the controller 460 may control power supplied to the heater 420 such that the operation of the heater 420 starts or ends. Based on the sensing result of the at least one sensor 430, the controller 460 may also control the amount of power supplied to the heater 420 and a power supply time such that the heater 420 may be heated to a certain temperature or maintained at a certain temperature.

In an embodiment, the aerosol generating device 400 may have a plurality of modes. For example, the modes of the aerosol generating device 400 may include a preheating mode, an operating mode, an idle mode, and a sleep mode. However, the modes of the aerosol generating device 400 are not limited thereto.

When the aerosol generating device 400 is not used, the aerosol generating device 400 may remain in the sleep mode. In the sleep mode, the controller 460 may control output power of the battery 410 such that power is not supplied to the heater 420. For example, before or after the use of the aerosol generating device 400, the aerosol generating device 400 may operate in the sleep mode.

To start the operation of the heater 420 after receiving a user input for the aerosol generating device 400, the controller 460 may set the mode of the aerosol generating device 400 to the preheating mode or may change the mode from the sleep mode to the preheating mode.

After detecting a user's puff using a puff detecting sensor, the controller 460 may change the mode of the aerosol generating device 400 from the preheating mode to a heating mode.

When an operating time of the aerosol generating device 400 in the heating mode exceeds a predefined time, the controller 460 may change the mode of the aerosol generating device 400 from the heating mode to the idle mode.

The controller 460 may count the number of puffs using a puff detecting sensor. When the number of puffs reaches a maximum puff count, the controller 460 may, interrupt power supply to the heater 420.

A temperature profile may be set in accordance with each of the preheating mode, the operating mode, and the idle mode. The controller 460 may control power supplied to the heater 420 based on a power profile for each mode such that an aerosol generating material is heated according to a temperature profile for each mode.

The controller 460 may control the user interface 440 based on a sensing result of the sensor 430. For example, when the number of puffs counted using a puff detecting sensor reaches a predefined puff count, the controller 460 may notify a user that the aerosol generating device 400 will stop shortly, using a lamp, a motor, and/or a speaker.

In an embodiment, the predefined puff count may be less than the maximum puff count, at which the heater 420 stops, by a certain number. For example, in the case where the maximum puff count is set to 10, when the number of puffs counted by a puff detecting sensor reaches 9, the controller 460 may notify a user that the aerosol generating device 400 will stop shortly, using a lamp, a motor, and/or a speaker.

When the controller 460 counts puffs using a puff detecting sensor and the current puff count reaches the maximum puff count, the controller 460 may stop the operation of the heater 420. For example, when the current puff count reaches the maximum puff count, the controller 460 may set the mode of the aerosol generating device 400 to the sleep mode.

Although not shown in FIG. 4, the aerosol generating device 400 may form an aerosol generating system together with a separate cradle. For example, the cradle may be used to charge the battery 410 of the aerosol generating device 400. For example, in a state where the aerosol generating device 400 is accommodated in an accommodation space of the cradle, the aerosol generating device 400 may receive power from a battery of the cradle such that the battery 410 of the aerosol generating device 400 may be charged.

As described above with reference to FIG. 1, an atomizer includes a liquid delivery element, which absorbs an aerosol generating material of the liquid storage 21. A wire may be wound on the exterior of the liquid delivery element. For example, a portion of the liquid delivery element may extend inside the liquid storage 21 such that the aerosol generating material may be absorbed into the liquid delivery element. In another example, an element (e.g., felt) absorbing liquid may be disposed between the liquid storage 21 and the liquid delivery element, and the aerosol generating material may be transmitted from the element to the liquid delivery element such that the aerosol generating material may be absorbed into the liquid delivery element.

Because the wire is wound on the exterior of the liquid delivery element, the wire may contact the aerosol generating material absorbed into the liquid delivery element. Accordingly, when the wire is heated to a high temperature, the aerosol generating; material absorbed into the liquid delivery element is vaporized, thereby generating aerosol.

When heating of the wire is stopped, the liquid delivery element may shrink due to cooling effect. Accordingly, contact between the liquid delivery element and the wire may be released, thereby creating a gap between the liquid delivery element and the wire. In this case, the aerosol generating material on the wire may flow along the surface of the wire and stagnate around an end of the wire, causing many problems.

In an embodiment, the wire is wound in a shape preventing an aerosol generating material from being delivered to the outside of the wire through an end of the wire. In other words, the wire is wound on the liquid delivery element such that the aerosol generating material on the wire does not stagnate around an end of the wire even when a gap is created between the liquid delivery element and the wire.

The wire may be wound in a spiral shape such that coils of the wire are spaced apart from each other by a certain distance on a surface of the liquid delivery element. For example, the certain distance may be selected in the range of 0.001 mm to 2 mm such that the liquid delivery element may be uniformly heated.

For example, one end portion of the wire may be in contact with a first portion of the surface of the liquid delivery element, and an opposite end portion of the wire may be in contact with a second portion of the surface of the liquid delivery element. At this time, the first portion is different from the second portion on the surface of the liquid delivery element.

For example, a first extension line extending from the first portion in parallel with the central axis of the liquid delivery element may be in a rotational relationship with a second extension line extending from the second portion in parallel with the central axis of the liquid delivery element. The first extension line and the second extension line are imaginary lines, and the rotation angle between the first extension line and the second extension line may be selected in the range of 90° to 270°. However, the rotation angle may vary according to the specification of the atomizer.

The first portion and the second portion may be in different quadrants of the surface of the liquid delivery element. The first portion and the second portion may be on the opposite sides on the surface of the liquid delivery element.

The end portions of the wire may point in a direction different from the direction of gravity. At this time, the direction different from the direction of gravity may be opposite to the direction of gravity but is not limited thereto. Hereinafter, the term "direction of gravity" refers to a downward direction when the atomizer is in an upright position.

The end portions of the wire may include a ridge-shaped portion (hereinafter, referred to as a "ridge portion") in the end coils. The top of the ridge portion may be separated from the liquid delivery element by a certain distance. For example, the certain distance may be selected in the range of 0.001 mm to 2 mm such that an aerosol generating material does not flow out of the wire through an end portion of the wire.

For example, the ridge portion may be included in the first and last coils of the wire but is not limited thereto.

Hereinafter, examples in which a wire is wound on a liquid delivery element will be described with reference to FIGS. 5 and 6.

FIG. 5 is a diagram of an example of an atomizer according to an embodiment.

FIG. 5 shows an example of a liquid delivery element 520 on which a wire 510 is wound. The wire 510 may be wound a plurality of times on the liquid delivery element 520. FIG. 5 illustrates an example in which the wire 510 is wound eight times. However, the number of times the wire 510 is wound on the liquid delivery element 520 is not limited.

During the manufacture of an atomizer 500, the wire 510 may be wound on the liquid delivery element 520 such that the wire 510 is in contact with the surface of the liquid delivery element 520. For example, the wire 510 may be wound in a spiral shape such that coils of the wire 510 are spaced apart from each other by a certain distance "d" on the surface of the liquid delivery element 520. The certain distance "d" may be selected in the range of 0.001 mm to 2 mm and may vary with the specification of the atomizer 500. In an embodiment, the wire 510 may be wound in a different shape in at least two portions (e.g., the first and last coils) than in the other portion.

Referring to FIG. 5, end portions 511 (i.e., end coils) of the wire 510 are respectively contacting different portions (i.e., the first and second portions) of the surface of the liquid delivery element 520. In the example illustrated in FIG. 5, the end portions 511 of the wire 510 are respectively contacting portions of the surface of the liquid delivery element 520, which face opposite directions, in detail, a right end portion of the wire 510 is in contact with a front portion of the surface of the liquid delivery element 520 and a left end portion of the wire 510 is in contact with a back portion of the surface of the liquid delivery element 520, but embodiments are not limited thereto.

For example, the first portion and the second portion may be in different quadrants of the surface of the liquid delivery element 520.

Although it is illustrated in FIG. 5 that the end portions 511 extend away from the liquid delivery element 520 in the direction of gravity, embodiments are not limited thereto. For example, the end portions 511 of the wire 510 may extend away from the liquid delivery element 520 in a direction different from the direction of gravity.

The end portions 511 of the wire 510 may include a ridge portion 513. In FIG. 5, the ridge portion 513 is formed in the first and last coils of the wire 510. The ridge portion 513 may not contact the liquid delivery element 520, and the top of the ridge portion 513 may be separated from the liquid delivery element 520 by a certain distance "h". For example, the certain distance "h" may be selected in the range of 0.001 mm to 2 mm and may vary with the specification of the atomizer 500.

For example, the ridge portion 513 may be formed in a direction different from the direction of gravity. Although the ridge portion 513 is formed in an opposite direction to the direction of gravity in FIG. 5, embodiments are not limited thereto.

Because the ridge portion 513 is included in the wire 510, an aerosol generating material on the wire 510 does not flow to an end 512 of the wire 510. Accordingly, liquid (e.g., an aerosol generating material) is prevented from being guided toward the end 512 of the wire 510 after heating of the wire 510 is stopped. Therefore, problems caused by leaked liquid may be solved.

FIG. 6 is a diagram of another example of an atomizer according to an embodiment.

FIG. 6 shows an example of a liquid delivery element 620 on which a wire 610 is wound. The wire 610 may be wound a plurality of times on the surface of the liquid delivery element 620, FIG. 6 illustrates an example in which the wire 610 is wound eight times. However, the number of times the wire 610 is wound on the liquid delivery element 620 is not limited. As described above with reference to FIG. 5, the wire 610 may be wound in a spiral shape such that coils of the wire 610 are spaced apart from each other by a certain distance on the surface of the liquid delivery element 620.

Referring to FIG. 6, end portions 611 of the wire 610 are respectively contacting different portions of the surface of the liquid delivery element 620. In the example illustrated in FIG. 6, the end portions 611 of the wire 610 are respectively contacting portions (i.e., the first and second portions) of the surface of the liquid delivery element 620, which face different directions. In detail, a right end portion of the wire 610 is in contact with a front portion of the surface of the liquid delivery element 6:20 and a left end portion of the wire 610 is in contact with a hack portion of the surface of the liquid delivery element 620, but embodiments are not limited thereto.

For example, the first portion and the second portion may be in different quadrants of the surface of the liquid delivery element 620.

The end portions 611 of the wire 610 may extend away from the liquid delivery element 620 in a direction different from the direction of gravity. For example, as shown in FIG. 6, ends 612 of the wire 610 may point in an opposite direction to the direction of gravity. However, embodiments are not limited thereto.

Because the end portions 611 of the wire 610 extend in a direction different from the direction of gravity, an aerosol generating material on the wire 610 does not flow to the ends 612 of the wire 610. Accordingly, liquid (e.g., an aerosol generating material) is prevented from being guided toward the ends 612 of the wire 610 after heating of the wire 610 is stopped. Therefore, problems caused by leaked liquid may be solved.

As described above, according to an embodiment, a portion of a wire is wound around the liquid delivery element in a different shape than the other portion of the wire such that an aerosol generating material is prevented from flowing along the wire. Accordingly, the aerosol generating material is prevented from gathering around an end of the wire.

At least one of the components, elements, modules or units (collectively "components" in this paragraph) represented by a block in the drawings such as the controller 460, the user interface 440, and the sensor 430 shown in FIG. 4 may be embodied as various numbers of hardware, software and/or firmware structures that execute respective functions described above, according to an example embodiment. For example, at least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Further, although a bus is not illustrated in the above block diagrams, communication between the components may be performed through the bus. Functional aspects of the above example embodiments may be implemented in algorithms that execute on one or more processors. Furthermore, the components represented by a block or processing steps may employ any number of related art techniques for electronics configuration, signal processing and/or control, data processing and the like.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

The invention claimed is:

1. An atomizer comprising:

a liquid delivery element configured to absorb an aerosol generating material contained in a liquid storage; and a wire configured to heat the aerosol generating material and wound on a surface of the liquid delivery element, wherein the wire is wound in a spiral shape such that coils of the wire are spaced apart from each other by a certain distance on the surface of the liquid delivery element, wherein one of end portions of the wire is in contact with a first portion of the surface of the liquid delivery element, and the other one of the end portions of the wire is in contact with a second portion of the surface of the liquid delivery element, and wherein at least one of the end portions of the wire comprises a ridge portion wound to be spaced apart from the liquid delivery element by a certain distance.

2. The atomizer of claim 1, wherein the end portions of the wire point in a direction different from a direction of gravity.

3. The atomizer of claim 1, wherein a top of the ridge portion is separated from the liquid delivery element by the certain distance.

4. The atomizer of claim 3, wherein the certain distance ranges from 0.001 mm to 2 mm.

5. A cartridge comprising:

a liquid storage configured to store an aerosol generating material; and an atomizer configured to heat the aerosol generating material to generate aerosol, wherein the atomizer includes:

a liquid delivery element configured to absorb the aerosol generating material; and a wire configured to heat the aerosol generating material and wound on a surface of the liquid delivery element, wherein the wire is wound in a spiral shape such that coils of the wire are spaced apart from each other by a certain distance on the surface of the liquid delivery element, wherein one of end portions of the wire is in contact with a first portion of the surface of the liquid delivery element, and the other one of the end portions of the wire is in contact with a second portion of the surface of the liquid delivery element, and wherein at least one of the end portions of the wire comprises a ridge portion wound to be spaced apart from the liquid delivery element by a certain distance.

6. The cartridge of claim 5, wherein the end portions of the wire point in a direction different from a direction of gravity.

7. The cartridge of claim 5, wherein a top of the ridge portion is separated from the liquid delivery element by the certain distance.

8. The cartridge of claim 7, wherein the certain distance ranges from 0.001 mm to 2 mm.

9. The atomizer of claim 1, wherein the end portions of the wire are disposed such that the aerosol generating material does not flow out of the wire through the end portions.

10. The cartridge of claim 5, wherein the end portions of the wire are disposed such that the aerosol generating material does not flow out of the wire through the end portions.

* * * * *